(12) United States Patent
McNeil et al.

(10) Patent No.: US 8,268,429 B2
(45) Date of Patent: *Sep. 18, 2012

(54) PERFORATED WEB PRODUCT

(75) Inventors: Kevin Benson McNeil, Loveland, OH (US); James Michael Singer, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/819,388

(22) Filed: Jun. 21, 2010

(65) Prior Publication Data

US 2011/0311750 A1  Dec. 22, 2011

(51) Int. Cl.
*B32B 29/00* (2006.01)
*B26F 1/00* (2006.01)

(52) U.S. Cl. ............ 428/43; 4/245.1; 4/245.8; 162/114; 428/98; 428/131

(58) Field of Classification Search ............... 428/43, 428/131, 98; 162/114; 4/245.1, 245.8
See application file for complete search history.

(56) References Cited

U.S. PATENT DOCUMENTS

| 405,412 | A | 6/1889 | Hicks |
| 453,003 | A | 5/1891 | Hicks |
| 714,652 | A | 11/1902 | Davis |
| 1,170,589 | A | 2/1916 | Wheeler |
| 3,467,250 | A | 9/1969 | D'Elia et al. |
| 3,583,558 | A | 6/1971 | Davis |
| 3,752,304 | A | 8/1973 | Alef |
| 3,762,542 | A | 10/1973 | Grimes |
| 3,770,172 | A | 11/1973 | Nystrand et al. |
| 3,931,886 | A | 1/1976 | Yamauchi |
| 4,029,938 | A | 6/1977 | Martin |
| 4,035,611 | A | 7/1977 | Martin et al. |
| 4,100,396 | A | 7/1978 | Martin |
| 4,199,090 | A | 4/1980 | Reed |
| 4,210,688 | A | 7/1980 | Sato |
| 4,219,727 | A | 8/1980 | Bolt |
| 4,220,490 | A | 9/1980 | Carlson |
| 4,247,754 | A | 1/1981 | Baier |
| 4,355,226 | A | 10/1982 | Hall |
| 4,423,101 | A | 12/1983 | Willstead |
| 4,441,952 | A | 4/1984 | Mullane, Jr. |
| 4,457,964 | A | 7/1984 | Kaminstein |
| 4,500,770 | A | 2/1985 | Vock et al. |

(Continued)

FOREIGN PATENT DOCUMENTS

DE    3043845 A1    10/1981

(Continued)

OTHER PUBLICATIONS

Anon, "Easycut—The Fast Way to Open a Product," *Packag. Rev.*, 24(5):31 (1998), Accession No. A20114701.

(Continued)

*Primary Examiner* — Brent O'Hern
(74) *Attorney, Agent, or Firm* — Peter D. Meyer

(57) ABSTRACT

Web products are disclosed which include forming selected perforation designs and patterns. The perforation designs and patterns can be formed in linear or nonlinear fashion, can extend in the cross direction or the machine direction and can be formed to complement or match an embossed or printed design on the web. The perforation designs and patterns can be formed utilizing various mechanical perforating techniques.

20 Claims, 8 Drawing Sheets

U.S. PATENT DOCUMENTS

| | | |
|---|---|---|
| 4,503,318 A | 3/1985 | Hall |
| 4,509,908 A | 4/1985 | Mullane, Jr. |
| 4,636,161 A | 1/1987 | Raley et al. |
| 4,646,364 A | 3/1987 | O'Larey |
| 4,806,303 A | 2/1989 | Bianco et al. |
| 4,842,794 A | 6/1989 | Hovis et al. |
| 4,884,719 A | 12/1989 | Levine et al. |
| 4,957,122 A | 9/1990 | Maldina et al. |
| 4,995,930 A | 2/1991 | Merz et al. |
| 5,041,317 A | 8/1991 | Greyvenstein |
| 5,062,331 A | 11/1991 | Michal et al. |
| 5,198,276 A | 3/1993 | Nakajima |
| 5,202,077 A | 4/1993 | Marco et al. |
| 5,205,454 A | 4/1993 | Schutz et al. |
| 5,246,110 A | 9/1993 | Greyvenstein |
| 5,405,663 A * | 4/1995 | Archibald et al. ........... 428/34.3 |
| 5,453,311 A | 9/1995 | Svensson |
| 5,613,347 A | 3/1997 | Weder |
| 5,616,387 A | 4/1997 | Augst et al. |
| 5,704,566 A | 1/1998 | Schutz et al. |
| 5,718,928 A | 2/1998 | Rieker |
| 5,727,458 A | 3/1998 | Schulz |
| 5,740,657 A | 4/1998 | Weder |
| 5,740,658 A | 4/1998 | Weder |
| D393,950 S | 5/1998 | Lockhart |
| 5,755,654 A | 5/1998 | Schulz et al. |
| 5,789,050 A | 8/1998 | Kang |
| 5,839,688 A | 11/1998 | Hertel et al. |
| 6,010,090 A | 1/2000 | Bushmaker et al. |
| 6,029,921 A | 2/2000 | Johnson |
| 6,119,439 A | 9/2000 | Stevie |
| 6,136,209 A | 10/2000 | Kang |
| 6,139,186 A | 10/2000 | Fraser |
| 6,223,641 B1 | 5/2001 | Kang |
| 6,289,777 B1 | 9/2001 | Hartmann et al. |
| 6,460,727 B1 | 10/2002 | Irwin |
| 6,487,762 B1 | 12/2002 | Fleissner |
| 6,557,224 B2 | 5/2003 | Fleissner |
| 6,565,794 B1 | 5/2003 | Fraser |
| 6,733,626 B2 | 5/2004 | Ruthven et al. |
| 6,735,834 B2 | 5/2004 | Fleissner |
| 6,838,040 B2 | 1/2005 | Mlinar et al. |
| 6,865,784 B2 | 3/2005 | Noelle |
| 7,222,346 B2 | 5/2007 | Lenormand et al. |
| 2002/0148085 A1 | 10/2002 | Fleissner |
| 2003/0101557 A1 | 6/2003 | Fleissner |
| 2003/0111169 A1 | 6/2003 | Baggot et al. |
| 2003/0131454 A1 | 7/2003 | Noelle |
| 2003/0132549 A1 | 7/2003 | Mlinar et al. |
| 2003/0218040 A1 | 11/2003 | Faulks et al. |
| 2005/0095403 A1 | 5/2005 | Noelle |
| 2005/0241788 A1 | 11/2005 | Baggot et al. |
| 2007/0014961 A1 | 1/2007 | Schneider et al. |
| 2007/0209099 A1 | 9/2007 | Issachar |
| 2008/0280088 A1 | 11/2008 | Baum |
| 2009/0022927 A1 | 1/2009 | Strobel et al. |

FOREIGN PATENT DOCUMENTS

| | | |
|---|---|---|
| DE | 20013469 U1 | 11/2000 |
| DE | 102006049680 A1 | 4/2008 |
| EP | 0 054 907 A2 | 6/1982 |
| EP | 0 195 113 A2 | 9/1986 |
| EP | 0 689 819 A2 | 1/1996 |
| EP | 0 974 433 A1 | 1/2000 |
| EP | 1 529 477 A1 | 5/2005 |
| FR | 2292560 A1 | 6/1976 |
| GB | 1598188 A | 9/1981 |
| GB | 2183489 A | 6/1987 |
| GB | 2184390 A | 6/1987 |
| GB | 2184391 A | 6/1987 |
| JP | 08-084685 A | 4/1996 |
| JP | 08084685 * | 4/1996 |
| JP | 9-279463 A | 10/1997 |
| JP | 11-091266 A | 4/1999 |
| JP | 11155759 A * | 6/1999 |
| JP | 3-140786 B2 | 3/2001 |
| JP | 2002-017607 A | 1/2002 |
| JP | 2004-049261 A | 2/2004 |
| JP | 2005-153997 A | 6/2005 |
| JP | 2005-296588 A | 10/2005 |
| JP | 2006-247311 A | 9/2006 |
| JP | 2007-117466 A | 5/2007 |
| WO | WO-92/03250 A2 | 3/1992 |
| WO | WO-03/026472 A1 | 4/2003 |
| WO | WO-2006/067260 A1 | 6/2006 |
| WO | WO-2008/068723 A1 | 6/2008 |
| WO | WO-2008/141598 A1 | 11/2008 |
| WO | WO 2010/076689 A1 | 8/2010 |

OTHER PUBLICATIONS

Klemm, "A Guide to Laser Cutting Technology, Part 1," *Screen Print*, 99(2):24-29 (2009), Accession No. A20331589.

Perkins et al., "Stress and Strain for Perforated Tensile Specimens, Part 2: FEA Simulations," *Tappi J.*, 6(4):22-27 (2007), Accession No. A20301227.

U.S. Appl. No. 12/819,271, filed Jun. 21, 2010, Hupp, Vaughn, Singer.

U.S. Appl. No. 12/819,277, filed Jun. 21, 2010, Hupp, Singer.

U.S. Appl. No. 12/819,286, filed Jun. 21, 2010, Hupp.

U.S. Appl. No. 12/819,296, filed Jun. 21, 2010, McNeil, Melliln.

U.S. Appl. No. 12/819,324, filed Jun. 21, 2010, McNeil, Mellin.

U.S. Appl. No. 12/819,344, filed Jun. 21, 2010, McNeil, Mellin.

U.S. Appl. No. 12/819,367, filed Jun. 21, 2010, McNeil, Singer.

U.S. Appl. No. 12/819,380, filed Jun. 21, 2010, McNeil, Singer.

U.S. Appl. No. 12/819,399, filed Jun. 21, 2010, Redd.

U.S. Appl. No. 12/819,420, filed Jun. 21, 2010, Kien, Redd.

U.S. Appl. No. 12/819,434, filed Jun. 21, 2010, Feldmann, Kien.

* cited by examiner

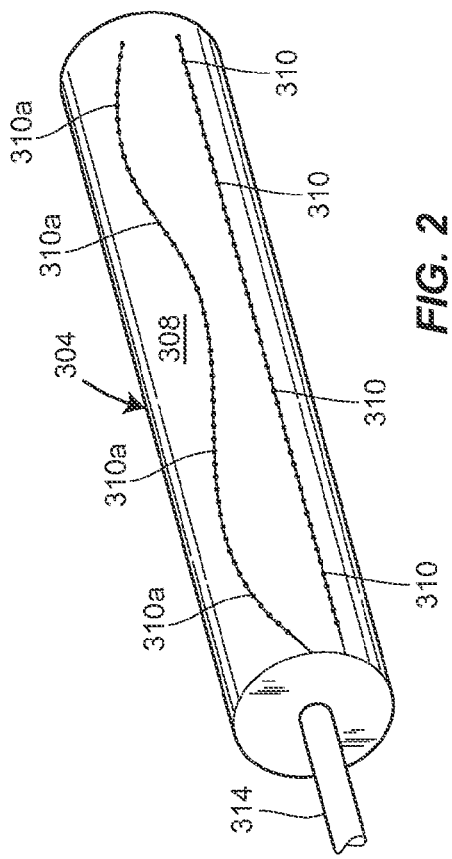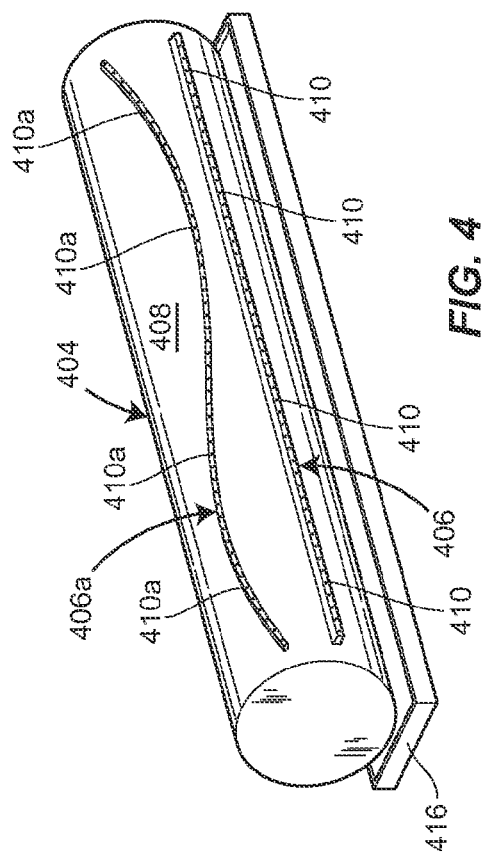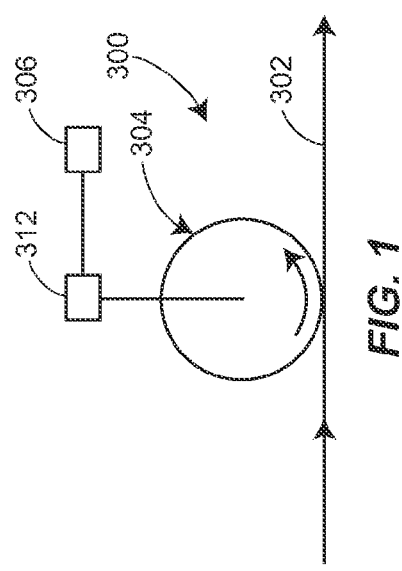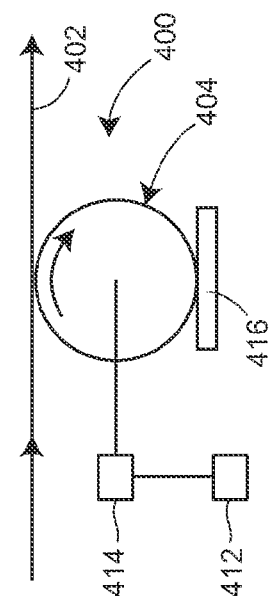

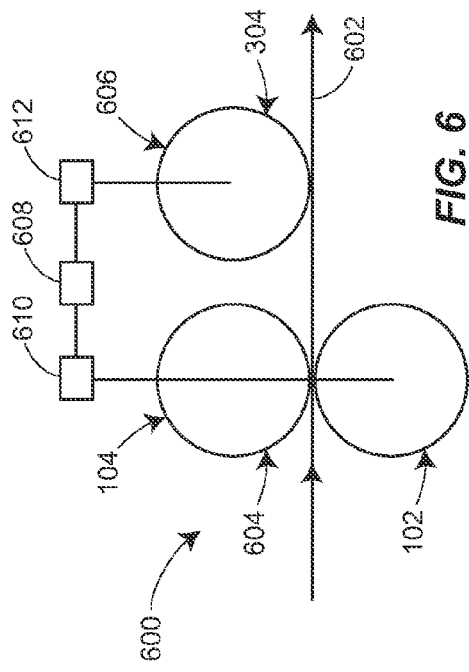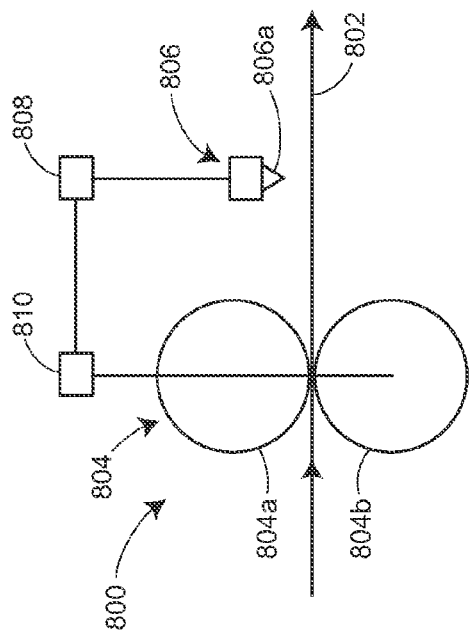

PERFORATED WEB PRODUCT

FIELD OF THE INVENTION

The present invention relates generally to perforated web products having various capabilities, characteristics and features. More particularly the present invention relates to web products of this type having significantly improved reliability, lower manufacturing costs, greater flexibility, and higher perforation quality.

BACKGROUND OF THE INVENTION

For many years, it has been well known to perforate products manufactured from webs such as paper towels, bath tissue and the like to thereby facilitate the removal of sheets from a roll by tearing. There have been proposed a variety of types of mechanical apparatus and numerous different methods for forming the perforations for these products. Typically, a moving blade has been utilized to perforate a web as it passes between the moving blade and a stationary anvil wherein the moving blade extends perpendicular to the direction of travel of the web.

While this conventional operation has been widely adopted, there are a number of well known drawbacks in terms of the overall reliability, manufacturing costs, flexibility, and perforation quality. Among the drawbacks is the fact that the interaction of the moving blade and the stationary anvil is known to impose a speed limitation since vibrations produced at high speeds adversely affect the overall quality of the perforations formed in a web. Further, the vibrations caused by the interaction of the moving blade and stationary anvil may result in costly web breaks or equipment malfunctions requiring a shutdown of the manufacturing operation.

For instance, it is known that the teeth on the moving blade become dull or broken after a period of use. This not only will result in an inferior and unacceptable level of perforation quality, but it will also require a temporary shutdown of the manufacturing operation to replace the moving blade and to discard inferior product produced immediately prior to shutdown. As will be appreciated, this results in unacceptable waste and significantly increased manufacturing costs.

In addition, another drawback to conventional equipment has been the inability to quickly change from one perforation pattern format (or sheet length) to another without significant down time for the changeover. It has typically been the case that this type of changeover requires the manufacturing operation to be shut down for at least several hours. While the changeover is occurring, there is obviously no product being produced and personnel must be actively engaged in implementing the changeover, all of which leads to significantly increased manufacturing costs.

In another respect, there has been a continuing need for greater flexibility in order to produce products having enhanced consumer desirability. For instance, it would be desirable to be able to produce both linear and nonlinear perforations as well as perforations extending in both the cross and machine directions. While various approaches have been suggested, none have offered the requisite level of perforation quality that would result in a fully acceptable product.

Additionally, it would be desirable to have perforations that are sufficiently strong to withstand winding of a web but also sufficiently weaken at least at the edges to facilitate the separation of one sheet from the next. Further, it would be desirable to have a wound or rolled perforated web product which is manufactured in such a manner that it is possible for a line of perforations to complement, register with, or match an embossed or printed pattern on the web.

While various efforts have been made in the past which were directed to overcoming one or more of the foregoing problems and/or to providing one or more of the foregoing features, there remains a need for perforating apparatuses and methods and perforated web products having improved reliability, lower manufacturing costs, greater flexibility, and higher perforation quality.

SUMMARY OF THE INVENTION

While it is known to manufacture perforated web products such as paper towels, bath tissue and the like to facilitate the removal of sheets from a roll by tearing, it has remained to provide perforating apparatuses and methods and perforated web products which overcome the noted problems and provide the noted features. Embodiments of the present disclosure provide perforating apparatuses and methods and perforated web products having improved features which result in multiple advantages including enhanced reliability, lower manufacturing costs, greater flexibility, and higher perforation quality. Such apparatuses and methods not only overcome the problems noted with currently utilized conventional manufacturing operations, but they also make it possible to design and produce perforated products such as paper towels, bath tissue, and the like having enhanced practical and aesthetic desirability for the consumer.

In certain embodiments, a web product is formed of paper or a like material having one or more plies and having a first side and a second side including a plurality of spaced apart and repeating lines of perforation. The repeating lines of perforation may each comprise at least a plurality of individual perforations suitably formed in the web. The plurality of individual perforations extends substantially from the first to the second side of the web and a liquid may be printed onto the web at each of the locations for, or separate from, the individual perforations.

BRIEF DESCRIPTION OF THE DRAWINGS

FIG. 1 is a schematic view illustrating an exemplary apparatus for printing a liquid onto a web utilizing a permeable roll as a liquid printing device;

FIG. 2 is a perspective view of an exemplary permeable roll suitable for printing liquid onto a web;

FIG. 3 is a schematic view illustrating another exemplary apparatus for printing a liquid onto a web utilizing an offset roll as a liquid printing device;

FIG. 4 is a perspective view of an exemplary offset roll suitable for printing a liquid onto a web;

FIG. 5 is a schematic view illustrating yet another exemplary apparatus for printing a liquid onto a web without contacting the web;

FIG. 6 is a schematic view illustrating another exemplary apparatus for printing a liquid onto a web downstream of a mechanical perforator;

FIG. 7 is a schematic view illustrating yet another exemplary apparatus for printing a liquid onto a web downstream of a mechanical perforator;

FIG. 8 is a schematic view illustrating another exemplary apparatus for printing a liquid onto a web downstream of a mechanical perforator;

DETAILED DESCRIPTION OF THE INVENTION

Figure 9:
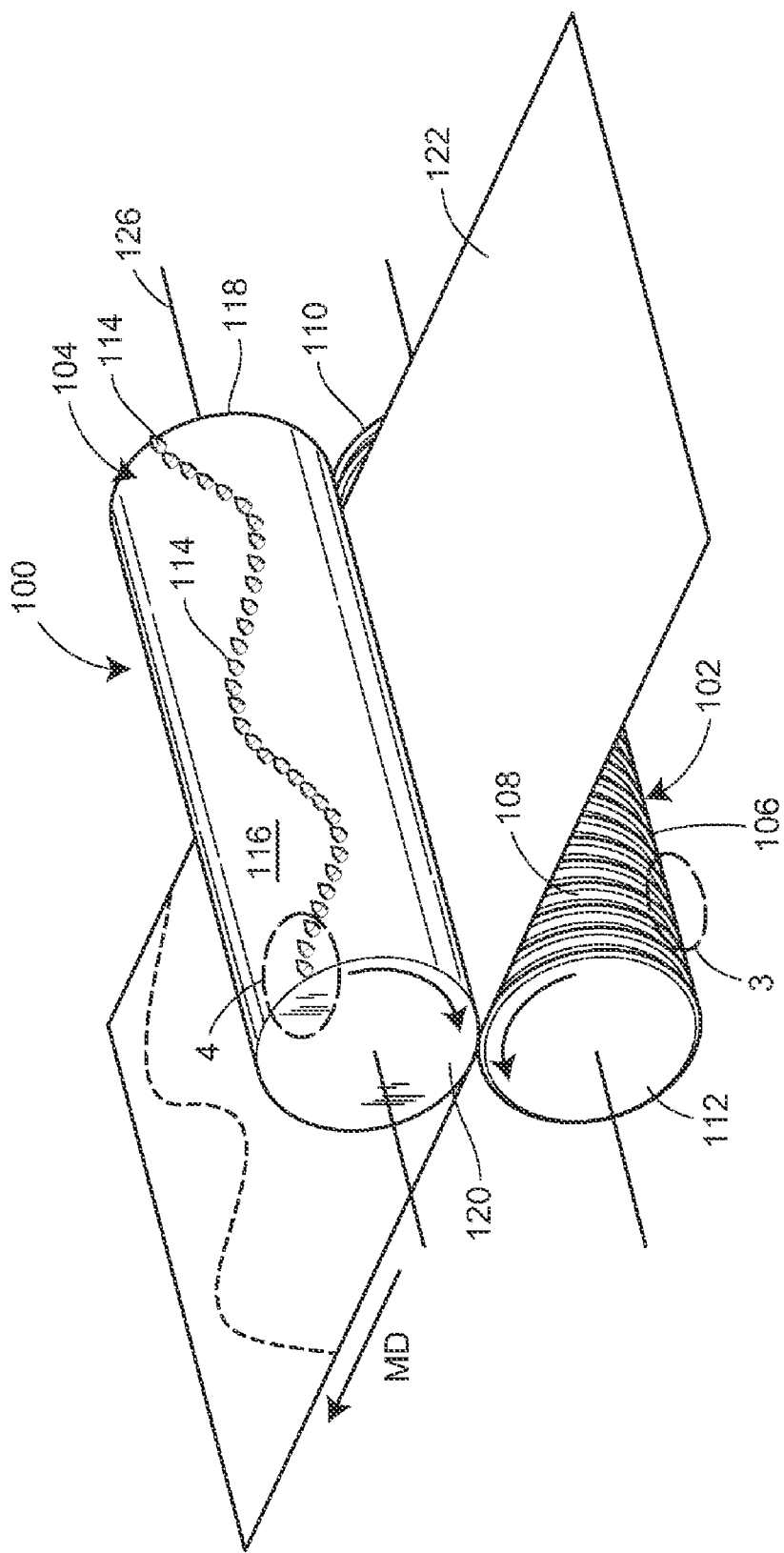
FIG. 9 is a perspective view of an exemplary apparatus for perforating a web utilizing a rotatable ring roll having at least one circumferential groove and a rotatable pattern roll having circumferential protrusions in cooperative alignment with the at least one circumferential groove.

As used herein, the term "machine direction" (MD) means the direction of travel of a web through any processing equipment. The term "cross direction" (CD) is orthogonal and coplanar thereto. The term "Z-direction" is orthogonal to both the machine and cross directions.

The various embodiments of the present disclosure described in detail below provide several non-limiting examples of perforating apparatuses, methods, and several distinct perforated web products having improved features which result in enhanced reliability, lower manufacturing costs, greater flexibility, and higher perforation quality. With regard to these non-limiting examples, the described apparatuses and methods make it possible to effectively and efficiently design and produce a variety of different perforated web products having enhanced practical and aesthetic desirability.

Referring to FIG. 1, an apparatus 300 for perforating a web 302 is illustrated which includes a liquid printing device 304 at least in close proximity to the web 302 when the web 302 is moved past the liquid printing device 304. The liquid printing device 304 is supplied with a liquid weakener and adapted to print the liquid weakener onto the web 302 at each of a plurality of discrete locations extending generally in a cross direction of the web. The apparatus 300 also includes a device for transporting the web 302 past the liquid printing device 304 and a controller 306 causing the liquid printing device 304 to cyclically print the liquid weakener onto the web 302 at the discrete locations.

More specifically, the web 302 is transported along a path that passes by the liquid printing device 304 by a device which may comprise a conventional web rewinder as is well known in the art. In this non-limiting embodiment, the liquid printing device 304 may comprise a permeable roll (FIG. 2) having an outer surface 308 for engaging the web 302 to print the liquid weakener onto the web through apertures 310 at each of the discrete locations. In FIG. 2, the apertures 310 form a linear set of apertures extending generally in the cross direction of the web 302, but apertures such as 310a forming an arcuate (e.g., nonlinear; have a MD and CD relation to an adjacent aperture 310a) set of apertures also may be used.

In this connection, it will be appreciated that both the linear set of apertures 310 and the arcuate set of apertures 310a extend generally in the cross direction of the web 302, and it is possible to utilize one or more linear sets of apertures 310, or one or more arcuate sets of apertures 310a, or both linear and arcuate sets of apertures in the permeable roll 304 depending only upon the desired perforation patterns) to be formed as repeating lines of perforations.

With regard to the controller 306, it may be coupled to a motor 312 provided to impart rotational movement to the permeable roll 304. The controller 306 will typically cause the motor 312 to drive the permeable roll 304 in such a manner that it will rotate at a speed where the instantaneous speed of the permeable roll 304 at the point at which it makes contact with the web 302 will be substantially the same as the speed at which the web 302 is being transported in the machine direction of the web 302. The motor 312 may be of any well known conventional type that is commonly used for imparting rotation to rolls in a web handling environment.

As also shown in FIG. 2, the permeable roll 304 may be provided with a supply of the liquid weakener for printing onto the web 302 through a hollow shaft 314 having a fluid rotary union (not shown) which communicates with the interior of the permeable roll 304.

Referring to FIG. 3, an apparatus 400 for perforating a web 402 is illustrated which includes a liquid printing device 404 at least in close proximity to the web 402 when the web 402 is moved past the liquid printing device 404. The liquid printing device 404 in this non-limiting embodiment may comprise an offset roll (FIG. 4) having a print image generally designated 406 on an outer surface 408 of the offset roll 404. The print image 406 may be comprised of a plurality of individual print elements 410, each adapted to print a liquid weakener at one of the plurality of discrete locations where liquid weakener is to be printed onto the web 402.

As with the apparatus 300 in FIGS. 1 and 2, the apparatus 400 is supplied with a liquid weakener and adapted to print the liquid weakener onto the web 402 at each of the plurality of discrete locations extending generally in the cross direction of the web 402. The apparatus 400 also includes a device for transporting the web 402 past the offset roll 404 which may again comprise a conventional web rewinder. In FIG. 4, the print elements 410 forming the print image 406 are linearly arranged for printing the liquid weakener in a linear pattern extending in the cross direction of the web 402 as the print elements 410 make direct contact with the moving web 402.

Alternatively, a nonlinear print image 406a comprised of a plurality of print elements 410a arranged nonlinearly (e.g., have a MD and CD relation to an adjacent print element 410a) may be utilized for printing the liquid weakener in a nonlinear pattern extending in the cross direction of the web 402. As with the apparatus 300 described above, it is possible to utilize one or more sets of linear print elements 410, or one or more sets of nonlinear print elements 410a, or sets of both linear and nonlinear print elements 410 and 410a.

As shown in FIG. 3, the apparatus 400 includes a controller 412 causing the offset roll 404 to cyclically print the liquid weakener onto the web 402 at the discrete locations corresponding to the locations of the individual print elements 410 and/or 410a. With regard to the controller 412, it may suitably be coupled to a motor 414 which is provided to impart rotational movement to the offset roll 404 through appropriate gearing in a well known, conventional manner. As will be appreciated, the motor 414 may be of any well known conventional type that is commonly used for imparting rotation to rolls in a web handling environment where the speed of the motor can be suitably controlled by a conventional controller.

Typically, the controller 412 will be used to cause the motor 414 to drive the offset roll 404 such that it will rotate at a speed where the instantaneous speed of the offset roll 404 at the point at which it makes contact with the web 402 will be at least substantially the same as the speed at which the web 402 is being transported in the machine direction of the web 402.

Referring to FIGS. 3 and 4, the offset roll 404 may be provided with a supply of the liquid weakener in a pan 416 through which the print elements 410 and/or 410a pass as the offset roll 404 is being rotated and just before the print elements contact the web 402 to print the liquid weakener onto the web 402 at each of the discrete locations.

With regard to both the apparatus 300 and the apparatus 400, the permeable roll 304 and the offset roll 404 are positioned in relation to the respective webs 302 and 402 so that the outer surface 308 of the permeable roll 304 having the apertures 310 and/or 310a therein and the print elements 410 and/or 410a on the outer surface 408 of the offset roll 404 make actual contact with the respective webs 302 and 402 during rotation of the permeable roll 304 and the offset roll 404.

With regard to the liquid weakener supplied to the apparatus 300 and/or the apparatus 400, it may suitably comprise a debonder for printing onto the respective webs 302 and 402 at each of the discrete locations where perforations are to be formed which may comprise one or more materials selected to chemically react with the web substrate material to cause the perforations to be formed at each of the discrete locations where the debonder is printed onto the web. By way of example only and not limitation, the debonders which may be suitable for printing onto paper may comprise water, hydrochloric acid, other acids, Di-tallow dimethyl ammonium methyl sulfite (DTDMAMS); Di-ethyl ethoxylated di-methyle amunium chlorite (DEEDMAC); Di-ethoxylated ethyl dimethyl amunium methyl sulfate (DEEDMAMS)+PEG, or any other material that will produce a desired degree of weakening in a particular web substrate when it is printed onto the web.

The liquid weakeners selected for use will preferably act over time so the perforations they form will provide the web with a first perforation tensile strength during production and a second, weaker perforation tensile strength after the web has been converted into a finished product such as paper towels, bath tissue and the like. This makes it possible for the web to have a sufficient tensile strength during manufacture to avoid undesirable breaks in the web. However, since the perforations will provide the web with a second, weaker tensile strength after it has been converted into a finished product, the consumer can more easily separate a selected sheet or sheets from the remainder of the finished product by tearing along a corresponding line of perforations.

As a result, in one non-limiting embodiment it may be desirable for the liquid weakener supplied to the apparatus 300 and/or the apparatus 400 and printed onto the respective webs 302 and the 402 to comprise a material such as dimethyl amunium methyl sulfite (DTDMANS) which has a sufficiently delayed reaction time before the perforations are formed at each of the plurality of discrete locations on the webs.

In another non-limiting embodiment, the liquid weakener may comprise a tinted (opaque) material to provide a visual indicator of the individual perforations formed in a web. In still another non-limiting embodiment, the liquid weakener may comprise a first liquid and a second liquid printed onto the web at each of the discrete locations wherein the first and second liquids interact to form the individual perforations. In yet another non-limiting embodiment, the individual perforations may be differently formed to result in the web having different tensile strengths in different areas.

In connection with the last-mentioned embodiment, any one or more of the individual perforations or any group of perforations in a particular area of the web may be formed to have different perforation tensile strengths by one of: i) printing a greater or lesser quantity of liquid weakener onto the web, or ii) printing one or more liquid weakeners having different characteristics onto the web, either at or near selected ones of the individual perforations or at or near any group of perforations in a particular area of the web.

Referring to FIG. 5, an apparatus 500 for perforating a web 502 is illustrated which includes a non-contact liquid printing device 504 in close proximity to the web 502 when the web 502 is moved past the liquid printing device 504. In this non-limiting embodiment, the liquid printing device 504 comprises a plurality of print nozzles such as 504a in close non-contacting relation to the web 502 for printing the liquid weakener onto the web 502 at each of the discrete locations.

As will be appreciated, FIG. 5 is a schematic view which is taken generally from one side of the web 502 as it is being transported generally in the machine direction of the web 502 past the print nozzles 504a. The print nozzles 504a may be arranged to print the liquid weakener at each of the plurality of discrete locations extending generally across the web 502 in the cross direction to produce a selected perforation pattern. Furthermore, a controller 506 may be provided to control the operation of the print nozzles 504a so they cyclically print the liquid weakener onto the web 502 in such a manner as to produce repeating lines of perforations.

By way of example, the non-contact liquid printing device 504 may comprise one or more inkjet printers, one or more laser printers, or any other comparable type of non-contact liquid printing device that is now available or may become available in the future.

With regard to the various apparatuses 300, 400 and 500, they may all be used to print a liquid weakener at a plurality of discrete locations where perforations are to be formed in a manner making it possible to produce virtually any selected perforation design. As a result, and by way of example, the selected perforation design which is produced by these apparatuses may be linear or have linear components and/or the design may be nonlinear (e.g., arcuate) or have nonlinear components. However, regardless of the selected perforation design, it may be produced by any of the apparatuses disclosed herein while providing significantly improved reliability, lower manufacturing costs, greater flexibility, and higher perforation quality.

In addition, it will be understood that at least some of the discrete locations where perforations are to be formed may be disposed generally from a first to a second side of the web in a cross direction or between the first and the second side of the web in the machine direction.

Referring to FIG. 6, an apparatus 600 for perforating a web 602 is illustrated which includes a mechanical perforator 604 for perforating the web 602 at each of a plurality of discrete locations extending generally in a cross direction of the web 602. The apparatus 600 also includes a device 606 for printing a liquid weakener onto the web 602 in locations extending generally in a cross direction of the web 602. With this arrangement, the mechanical perforator 604 may mechanically perforate the web 602 and the liquid printing device 606 may print the liquid weakener onto the web 602 to thereby form perforations in the web 602.

In one non-limiting embodiment, the liquid printing device 606 may print the liquid weakener onto the web 602 in each of the discrete locations where the web 602 has been perforated by the mechanical perforator 604, and the mechanical perforator 604 can be located upstream of the liquid printing device 606 so the liquid printing device 606 can print the liquid weakener after the web 602 has been mechanically perforated to form enhanced perforations.

In one non-limiting alternative to the foregoing, the liquid printing device 606 can be located and supplied with a liquid weakener to print the liquid weakener onto the web 602 either before (i.e., in front of) or after (i.e., behind) where the web 602 has been mechanically perforated, or even to print the liquid weakener between each of the mechanical perforations, or entirely across the area where the mechanical perforations are formed, or even in front of or behind each of the discrete locations where the web 602 has been mechanically perforated.

From the foregoing, it will be appreciated that the web 602 may be provided with two distinct forms of perforations, i.e., mechanical perforations and liquid perforations, or it may be provided with mechanical perforations that are enhanced as a result of printing a liquid weakener onto the mechanical perforations, between the mechanical perforations, across the area of the mechanical perforations, before the mechanical perforations or after the mechanical perforations.

In still another non-limiting alternative to the foregoing, at least one of the mechanical perforator 604 and the liquid printing device 606 forms corresponding perforations, i.e., either mechanical perforations or liquid perforations or a combination of mechanical perforations and liquid perforations to form enhanced perforations, wherein the corresponding perforations extend generally in a machine direction of the web 602 between a first and a second side of the web 602.

In the embodiment illustrated in FIG. 6, the apparatus 600 may suitably utilize a mechanical perforator 604 which includes a rotatable ring roll 102 and a rotatable pattern roll 104 as described below in connection with the apparatus 100 illustrated in FIGS. 9-10. The apparatus 600 includes a device for transporting the web 602 past the mechanical perforator 604 and the liquid printing device 606, and a controller 608 for controlling the mechanical perforator 604 and the liquid printing device 606. While a single controller 608 has been illustrated in FIG. 6, the apparatus 600 could include one controller for the mechanical perforator 604 and another for the liquid printing device 606 for printing the liquid weakener onto the web 602.

With regard to the liquid printing device 606, it may suitably comprise a permeable roll 304 as previously described in detail above in connection with the apparatus 300 which is more fully illustrated in FIGS. 1 and 2.

Referring to FIG. 9, the apparatus 100 for mechanically perforating a web is illustrated as including a rotatable ring roll 102 and a rotatable pattern roll 104. The ring roll 102 has at least one circumferential groove 106 extending about an outer surface 108, i.e., the ring roll 102 may have a single circumferential groove extending helically about the outer surface 108 from one end 110 to the other end 112 of the ring roll 102. However, the ring roll 102 may also be formed to have a plurality of parallel circumferential grooves 106 disposed between the ends 110 and 112.

Referring again to FIG. 9, the pattern roll 104 has circumferential protrusions 114 extending from an outer surface 116. The circumferential protrusions 114 in a non-limiting example may be disposed from one end 118 to the other end 120 of the pattern roll 104 and located in a nonlinear fashion as shown or in a linear fashion. The circumferential protrusions 114 are positioned in selected cooperative alignment with the circumferential groove(s) 106.

Figure 10:
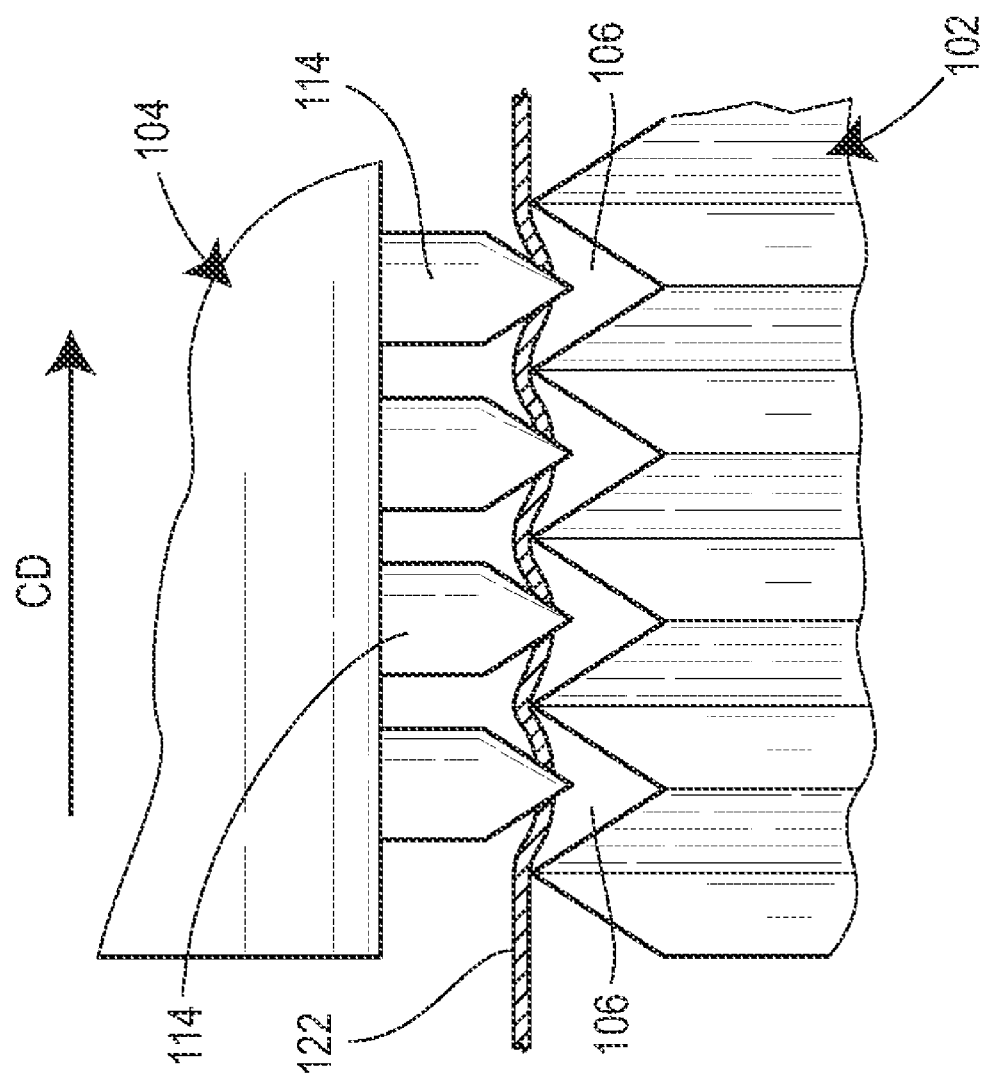
FIG. 10 is a detailed view illustrating the circumferential protrusions on the rotatable pattern roll in cooperative alignment with the at least one circumferential groove in the rotatable ring roll and with the circumferential protrusions penetrating a web to form perforations.

In other words, the circumferential protrusions 114 may be positioned relative to the circumferential groove(s) 106 as shown in FIG. 10. In this manner, the circumferential protrusions 114 can cooperate with the circumferential groove(s) 106 in order to penetrate the web for the purpose of forming perforations therein. Also, the circumferential protrusions may be circumferentially positioned in any location on the outer surface 116 of the pattern roll 104.

By controlling the various physical characteristics of the circumferential protrusions 114 and their relationship with the circumferential groove(s) 106, it is possible to control the degree of penetration to thereby control the degree of weakening of the web.

With regard to the controller 608, it may be coupled to a motor 610 provided to impart rotational movement to the ring roll 102 and the pattern roll 104 of the mechanical perforator 604, and it may also be coupled to a motor 612 provided to impart rotational movement to the liquid printing device 606. Typically, the controller 608 will cause the motors 610 and 612 to drive the ring roll 102, pattern roll 104, and permeable roll 304 so they all rotate at a speed where the instantaneous speed of the rolls at the point of contact with the web 602 will be substantially the same as the speed at which the web 602 is transported in the machine direction. With regard to the motors 610 and 612, they may suitably be of any well known conventional type that is commonly used for imparting rotation to rolls in a web handling environment and, likewise, the controller 608 may be of any well known conventional type for controlling motors such as 610 and 612.

By arranging the permeable roll 304 so that it will print a liquid weakener onto the web 602, such as a debonder which is selected to chemically react with the material of the web 602, at any of the previously described selected locations relative to the mechanical perforations, the apparatus 600 is particularly well suited for forming enhanced perforations in the web 602, i.e., a mechanical perforation that has been enhanced as a result of the debonder chemically reacting with the material of the web 602 to weaken it in or near the area of the mechanical perforations.

Referring to FIG. 7, an apparatus 700 for perforating a web 702 is illustrated which includes a mechanical perforator 704 for perforating the web 702 at each of a plurality of discrete locations extending generally in a cross direction of the web 702. The apparatus 700 also includes a device 706 for printing a liquid weakener onto the web 702 in locations extending generally in a cross direction of the web 702. With this arrangement, the mechanical perforator 704 may mechanically perforate the web 702 and the liquid printing device 706 may print the liquid weakener onto the web 602 to thereby form perforations in the web 702.

In one non-limiting embodiment, the liquid printing device 706 may print the liquid weakener onto the web 702 in each of the discrete locations where the web 702 has been perforated by the mechanical perforator 704, and the mechanical perforator 704 can be located upstream of the liquid printing device 706 so the liquid printing device 706 can print the liquid weakener after the web 702 has been mechanically perforated to form enhanced perforations.

In one non-limiting alternative to the foregoing, the liquid printing device 706 can be located and supplied with a liquid weakener to print the liquid weakener onto the web 702 either before (i.e., in front of) or after (i.e., behind) where the web 702 has been mechanically perforated, or even to print the liquid weakener between each of the mechanical perforations, or entirely across the area where the mechanical perforations are formed, or even in front of or behind each of the discrete locations where the web 702 has been mechanically perforated.

From the foregoing, it will be appreciated that the web 702 may be provided with two distinct forms of perforations, i.e., mechanical perforations and liquid perforations, or it may be provided with mechanical perforations that are enhanced as a result of printing a liquid weakener onto the mechanical perforations, between the mechanical perforations, across the area of the mechanical perforations, before the mechanical perforations, or after the mechanical perforations.

In still another non-limiting alternative to the foregoing, at least one of the mechanical perforator 704 and the liquid printing device 706 forms corresponding perforations, i.e., either mechanical perforations or liquid perforations or a combination of mechanical perforations and liquid perforations to form enhanced perforations, wherein the corresponding perforations extend generally in a machine direction of the web 702 between a first and a second side of the web 702.

In the embodiment illustrated in FIG. 7, the apparatus 700 may suitably utilize a mechanical perforator 704 which includes a rotatable male roll 202 and a rotatable female roll 204 as described below in connection with the apparatus 200 illustrated in FIGS. 11 and 12. The apparatus 700 includes a device for transporting the web 702 past the mechanical perforator 704 and the liquid printing device 706, and a controller 708 for controlling the mechanical perforator 704 and the liquid printing device 706. While a single controller 708 has been illustrated in FIG. 7, the apparatus 700 could include one controller for the mechanical perforator 704 and another for the liquid printing device 706 for printing the liquid weakener onto the web 702.

With regard to the liquid printing device 706, it may suitably comprise an offset roll 404 as previously described in detail above in connection with the apparatus 400 which is more fully illustrated in FIGS. 3 and 4.

Figure 11:
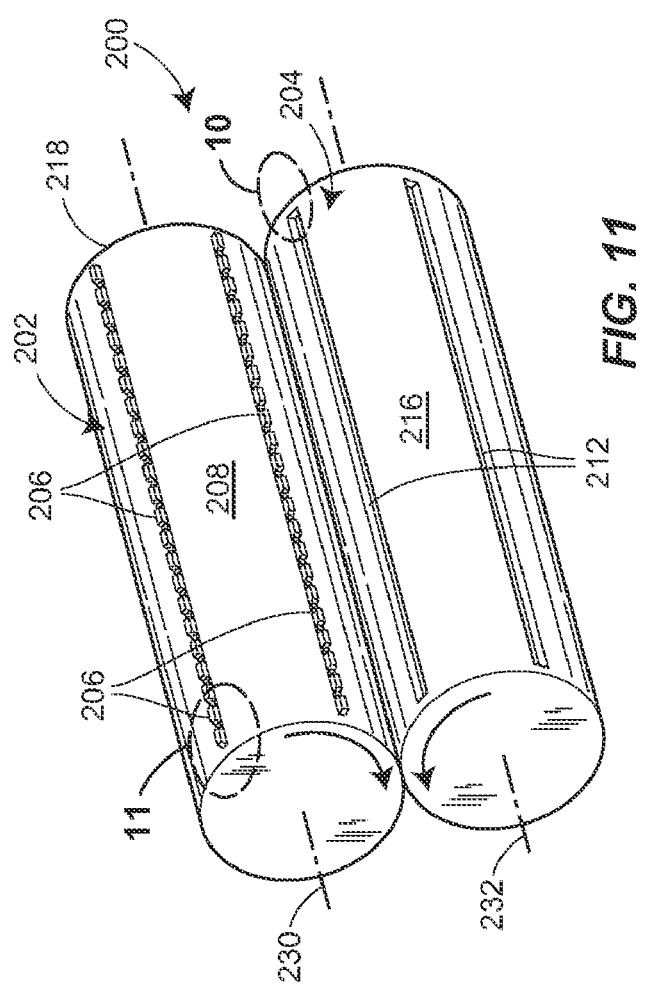
FIG. 11 is a perspective view of an exemplary apparatus for perforating a web utilizing a rotatable male roll having perforating elements defining web engaging edges and a rotatable female roll having a pocket for receiving the perforating elements and defining a web supporting edge.

Referring to FIG. 11, the apparatus 200 for perforating a web is illustrated as including a rotatable male roll 202 and a rotatable female roll 204. The male roll 202 includes perforating elements 206 which define web engaging edges 206a wherein the web engaging edge 206a of each of the perforating elements 206 is spaced outwardly of an outer surface 208 of the male roll 202 for overstraining a web 210 (FIG. 2). The female roll 204 has a pocket 212 which defines a web supporting edge 214 wherein the pocket 212 defining the web supporting edge 214 extends inwardly to define a recess in an outer surface 216 of the female roll 204 to receive the perforating elements 206 and web 210 therein. By referring to FIGS. 11 and 12, it will be understood how the pocket 212 in the female roll 204 receives the perforating elements 206 and web 210.

Figure 12:
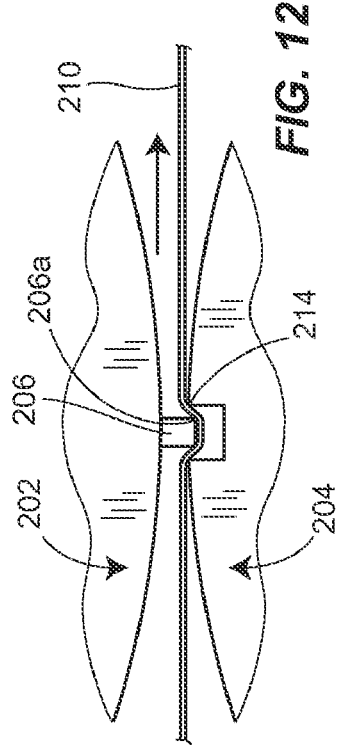
FIG. 12 is a schematic view illustrating a web engaging edge defined by a perforating element overstraining a web.

In particular, FIGS. 11 and 12 illustrate that the perforating elements 206 on the male roll 202 and the pocket 212 in the female roll 204 are located such that the pocket 212 in the female roll 204 will receive the perforating elements 206 on the male roll 202 during rotation of the male roll 202 and the female roll 204. More specifically, the male roll 202 is positioned relative to the female roll 204 so the web engaging edges 206a are closely spaced from the web supporting edge 214 by a distance selected to permit the web engaging edges 206a to overstrain the web 210 without making contact with the web supporting edge 214. In other words, when the perforating elements 206 on the male roll 202 are received in the pocket 212 in the female roll 204 as illustrated in FIG. 2, the web engaging edges 206a defined by the perforating elements 206 will be closely spaced from, but not make contact with, the web supporting edge 214.

In other words, the perforating elements 206 may be positioned relative to the pocket 212 as shown in FIG. 12. In this manner, the perforating elements 206 can cooperate with the pocket 212 to overstrain the web for the purpose of forming perforations therein. Also, the perforating elements 206 may be positioned in any location on the outer surface 216 of the female roll 204.

By controlling the various physical characteristics of the perforating elements 206 and their relationship with the pocket 212, it is possible to control the degree of overstraining to thereby control the degree of weakening of the web.

With regard to the controller 708, it may be coupled to a motor 710 provided to impart rotational movement to the male roll 202 and the female roll 204 of the mechanical perforator 704, and it may also be coupled to a motor 712 provided to impart rotational movement to the liquid printing device 706. Typically, the controller 708 will cause the motors 710 and 712 to drive the male roll 202, female roll 204, and offset roll 404 so they all rotate at a speed where the instantaneous speed of the rolls at the point of contact with the web 702 will be substantially the same as the speed at which the web 702 is transported in the machine direction. With regard to the motors 710 and 712, they may suitably be of any well known conventional type that is commonly used for imparting rotation to rolls in a web handling environment and, likewise, the controller 708 may be of any well known conventional type for controlling motors such as 710 and 712.

By arranging the offset roll 404 so that it will print a liquid weakener onto the web 702, such as a debonder which is selected to chemically react with the material of the web 702, at any of the previously described selected locations relative to the mechanical perforations, the apparatus 700 is particularly well suited for forming enhanced perforations in the web 702, i.e., a mechanical perforation that has been enhanced as a result of the debonder chemically reacting with the material of the web 702 to weaken it in or near the area of the mechanical perforations.

Referring to FIG. 8, an apparatus 800 for perforating a web 802 is illustrated which includes a mechanical perforator 804 for perforating the web 802 at each of a plurality of discrete locations extending generally in a cross direction of the web 802. The apparatus 800 also includes a device 806 for printing a liquid weakener onto the web 802 in locations extending generally in a cross direction of the web 802. With this arrangement, the mechanical perforator 804 may mechanically perforate the web 802 and the liquid printing device 806 can print the liquid weakener onto the web 802 to thereby form perforations in the web.

In one non-limiting embodiment, the liquid printing device 806 may print the liquid weakener onto the web 702 in each of the discrete locations where the web 702 has been perforated by the mechanical perforator 804, and the mechanical perforator 804 can be located upstream of the liquid printing device 806 so the liquid printing device 806 can print the liquid weakener after the web 802 has been mechanically perforated to form enhanced perforations.

In one non-limiting alternative to the foregoing, the liquid printing device 806 can be located and supplied with a liquid weakener to print the liquid weakener onto the web 802 either before (i.e., in front of) or after (i.e., behind) where the web 802 has been mechanically perforated, or even to print the liquid weakener between each of the mechanical perforations, or entirely across the area where the mechanical perforations are formed, or even in front of or behind each of the discrete locations where the web 802 has been mechanically perforated.

From the foregoing, it will be appreciated that the web 802 may be provided with distinct forms of perforations, i.e., mechanical perforations and liquid weakener perforations, or it may be provided with mechanical perforations that are enhanced as a result of printing a liquid weakener onto the mechanical perforations, between the mechanical perforations, across the area of the mechanical perforations, before the mechanical perforations, or after the mechanical perforations.

In still another non-limiting alternative to the foregoing, at least one of the mechanical perforator 804 and the liquid printing device 806 forms corresponding perforations, i.e., either mechanical perforations or liquid perforations or a combination of mechanical perforations and liquid perforations to form enhanced perforations, wherein the corresponding perforations extend generally in a machine direction of the web 802 between a first and a second side of the web 802.

In the embodiment illustrated in FIG. 8, the apparatus 800 may suitably utilize a mechanical perforator 804 of either of the types described above in connection with the embodiment illustrated in FIGS. 6 and 7. Thus, it will be appreciated that the mechanical perforator 804 may advantageously utilize a rotatable ring roll 102 and a rotatable pattern roll 104 as previously described in detail above in connection with the apparatus 600 (see, also, FIGS. 9 and 10) or, alternatively, the mechanical perforator 804 may advantageously utilize a rotatable male roll 202 and a rotatable female roll 204 as previously described in detail above in connection with the apparatus 700 (see, also, FIGS. 11 and 12). Similarly, it will be appreciated that either of these two types of mechanical perforators may be interchangeably utilized in connection with the apparatus 600 illustrated in FIG. 6 or the apparatus 700 illustrated in FIG. 7.

As in the embodiments of FIGS. 6 and 7, the apparatus 800 includes a device for transporting the web 802 past the mechanical perforator 804 and the liquid printing device 806, and it also includes a controller 808 for controlling the mechanical perforator 804 and the liquid printing device 806. While a single controller 808 has been illustrated in FIG. 8, the apparatus 800 could include one controller for the mechanical perforator 804 and another for the liquid printing device 806 for printing the liquid weakener onto the web 802.

The liquid printing device 806 may suitably comprise a non-contact liquid printing device having a plurality of print nozzles such as 806a located in close non-contacting relation to the web 802 for printing the liquid weakener onto the web 802 at each of the desired locations.

With regard to the controller 808, it may be coupled to a motor 810 provided to impart rotational movement to the rolls 804a and 804b of the mechanical perforator 804, and it may also be coupled to the non-contact liquid printing device 806 to control the operation of the print nozzles such as 806a. Typically, the controller 808 will cause the motors 810 to drive the rolls 804a and 804b so they rotate at a speed where the instantaneous speed of the rolls at the point of contact with the web 802 will be substantially the same as the speed the web 802 is transported in the machine direction and will direct the print nozzles 806a to print. Specifically, the controller 808 will be programmed so as to cause the print nozzles 806a to print the liquid weakener onto the web 802 at each of the desired locations in relation to where the web has been mechanically perforated upstream of the liquid printing device 806 by the mechanical perforator 804.

With regard to the motor 810, it may suitably be of any well known conventional type commonly used for imparting rotation to rolls in a web handling environment. With regard to the controller 808, it may comprise a single controller (FIG. 8), or the apparatus 800 may include one controller for the mechanical perforator 804 and another controller for the non-contact liquid printing device 806. In either case, the controller or controllers may be of any well known conventional type for controlling the motor 810 and the non-contact liquid printing device 806.

Considering the embodiments of FIGS. 1-8, the various apparatuses 300, 400, 500, 600, 700, and 800 are all well suited for perforating the respective webs 302, 402, 502, 602, 702, and 802, respectively, in both a cross direction and a machine direction. This may be achieved by, for example, forming appropriate apertures in the permeable role 304 in both the cross direction and the machine direction, or by forming a print image having print elements on the offset roll 404 in both the cross direction and the machine direction, or by utilizing one or more non-contact liquid printing devices 504 having appropriately arranged print nozzles 504a in both the cross direction and the machine direction. Alternatively, or in addition to, one of the various perforating devices may be utilized to perforate the webs generally in the cross direction and another of the perforating devices may be utilized to perforate the webs generally in the machine direction.

Figure 13:
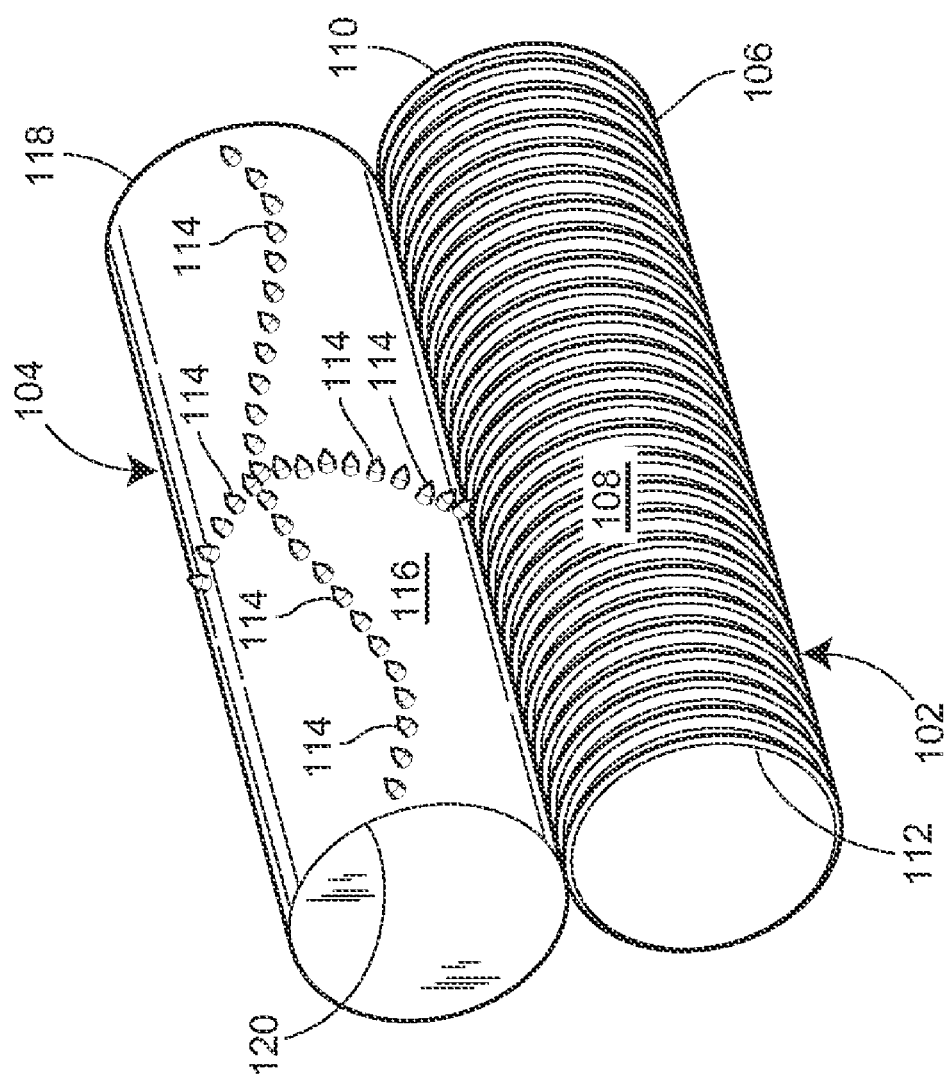
FIG. 13 is a perspective view of an exemplary apparatus for perforating a web utilizing a rotatable ring roll and a rotatable pattern roll having circumferential protrusions located to form nonlinear perforations in both the cross and machine directions.

With regard to the foregoing, and referring to FIG. 13, a pattern roll 104 may be formed to have circumferential protrusions 114 extending at least generally in the machine direction of a web although, as shown, circumferential protrusions 114 extend generally in both the machine direction and the cross direction of a web. The pattern roll 104 in FIG. 13 may be used in the apparatus 600 in the embodiment of FIG. 6 wherein the permeable roll 304 may form enhanced perforations generally in the cross direction and, if desired, it may also be used to form enhanced perforations generally in the machine direction or alternatively it may be used to print liquid onto the web in any desired position relative to the perforations formed by the circumferential protrusions 114 as previously discussed above. In short, the permeable roll 304 may be formed to have an aperture 310 located to correspond to each of the circumferential protrusions 114 or any location where it is desired to provide or enhance a perforation in the cross direction and/or the machine direction regardless of whether the perforation pattern is linear and/or non-linear.

Figure 14:
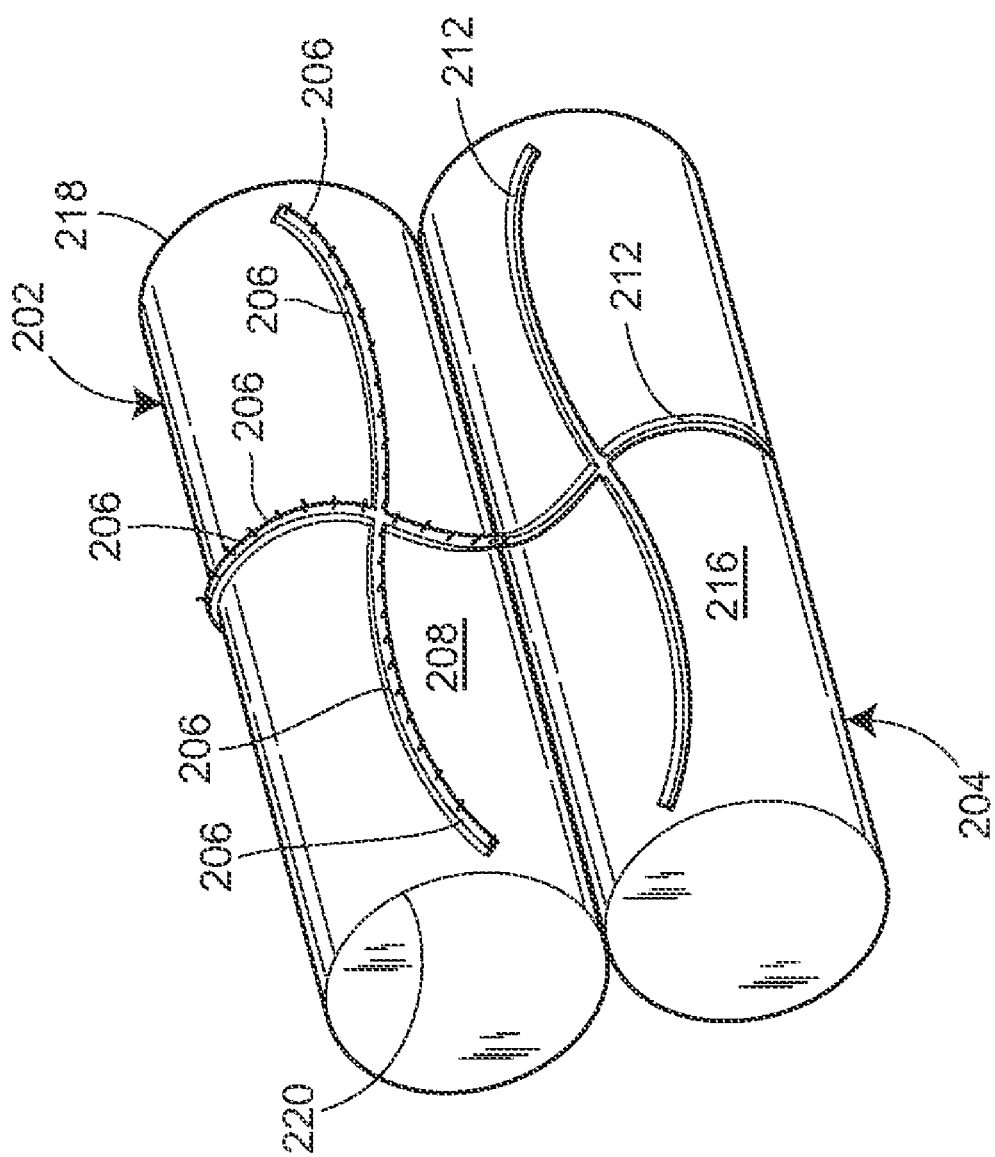
FIG. 14 is a perspective view of another exemplary apparatus for perforating a web utilizing a rotatable ring roll and a rotatable pattern roll having perforating elements and pockets located to form nonlinear perforations in both the cross and machine directions.
Figure 16:
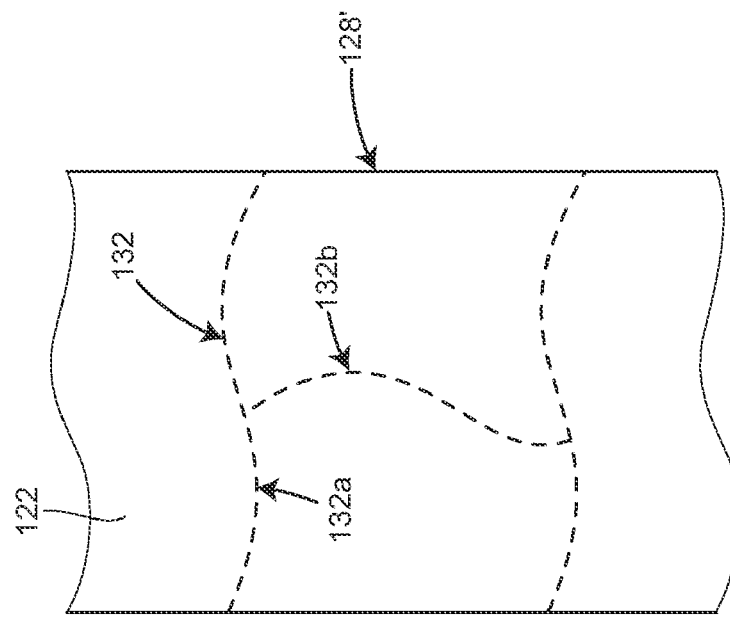
FIG. 16 is a plan view of a single sheet of a perforated web product having another of many different perforation designs or shapes extending non-linearly in the cross direction as well as the machine direction of the web.

Referring to FIG. 14, the male roll 202 may be formed to have perforating elements 206 which define web engaging edges 206a extending at least generally in the machine direction although, as shown, it has been formed with the perforating elements 206 extending generally in both the machine and cross directions. The male roll 202 in FIG. 14 may be used in the apparatus 700 in the embodiment of FIG. 7 wherein the offset roll 404 may form enhanced perforations generally in the cross direction and, if desired, it may also be used to form enhanced perforations generally in the machine direction or alternatively it may be used to print liquid onto the web in any desired position relative to the perforations formed by the perforating elements 206 as previously discussed above. In short, the offset roll 404 may have a print image such as 406a formed with the print elements located to correspond to each of the perforating elements 206 or in any location where it is desired to provide or enhance a perforation in the cross direction and/or the machine direction regardless of whether the perforation pattern is linear and/or non-linear.

Figure 15:
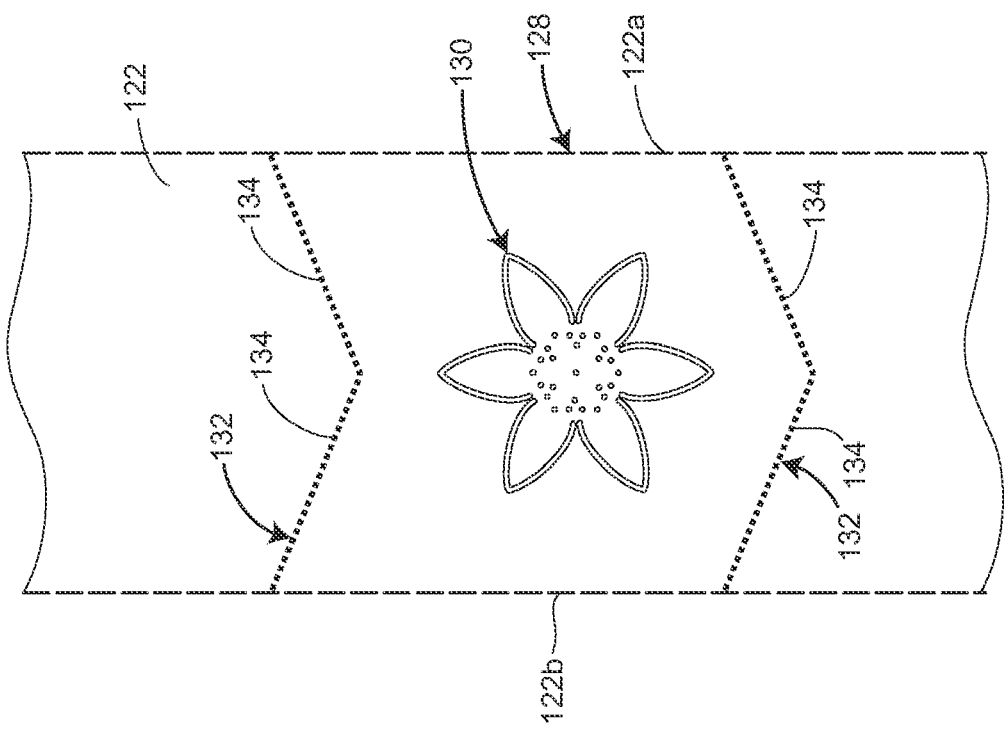
FIG. 15 is a plan view of a single sheet of a perforated web product having an embossed or printed pattern formed thereon and also having a selected perforation design utilizing any of the foregoing apparatuses.

Referring to FIG. 15, a single sheet 128 formed on the web 122 by any of the foregoing apparatuses and having an embossed or printed indicia or aesthetic pattern 130 has been illustrated. The single sheet 128 has a shaped perforation pattern 132 extending generally in the cross direction which at least complements and can even match the indicia or aesthetic pattern 130, if it is desired to do so. As shown, the contours of the perforation pattern 132 form a chevron shape which is complementary to the indicia or aesthetic pattern 130 by appropriate arrangement of the individual perforations 134. An exemplary but non-limiting apparatus and process for registering repeating shaped perforation patterns 132 that are formed in web 122 with the indicia or aesthetic pattern 130 are disclosed in U.S. Pat. Nos. 7,222,436 and 7,089,854.

The web 122 may be formed of paper or a like material having one or more plies and having a first side 122a and a second side 122b. The web 122 may include a plurality of spaced apart and repeating lines of perforation. These spaced apart and repeating lines of perforation may either be linear or nonlinear like the shaped perforation patterns 132 in FIG. 15.

As shown in FIG. 15, the repeating lines of perforation may comprise a plurality of individual perforations 134 extending substantially from the first side 122a to the second side 122b of the web 122. Each one of the plurality of individual perforations 134 is selectively located in relation to the adjacent ones of the individual perforations 134. In this manner, a selected perforation design such as the shaped perforation patterns 132 is provided for each of the repeating lines of perforation which are formed along the web 122 by any of the foregoing apparatuses.

In one non-limiting embodiment, the web 122 is presented to the consumer as a convolutely wound or rolled paper product. Such a product is suitable for use as paper towels, bath tissue and the like and may have a length in the machine direction of at least 500 inches and most preferably up to at least about 1000 inches. To separate one product from the next, a chop-off cut is used to terminate one product and start the succeeding product during manufacture.

To achieve the foregoing, a chop-off roll 36 and a bedroll 38 may be utilized downstream of any of the foregoing apparatuses to form a chop-off in the manner illustrated and described in U.S. Pat. No. 7,222,436. The perforation pattern formed by any of the foregoing apparatuses may be linear or non-linear and may or may not extend perpendicular to the machine direction of the web 122. Similarly, the chop-off may take various forms although in one non-limiting embodiment the chop-off may be shaped rather than straight, e.g., and by way of example only, the chop-off may be chevron shaped substantially in the form shown in FIG. 15.

FIG. 15 illustrates generally a plurality of perforations that may advantageously take the form of a shaped perforation pattern 132. However, the chop-off may roll may be formed so that only the chop-off will be shaped. By so doing, it will facilitate the consumer starting the removal of sheets from an exposed end of the wound or rolled perforated paper product.

In addition, the chop-off may have this or a similar shape or design by appropriately forming the chop-off roll regardless of whether the perforation pattern has the same or a similar shape or design or is simply linear and orthogonal to the machine direction of the web 122.

Referring to FIG. 15A, a single sheet 128' is illustrated as produced with any of the foregoing apparatuses. The single sheet 128' has a perforation pattern 132 which is comprised of a non-linear perforation pattern 132a extending generally in the cross direction and a non-linear perforation pattern 132b extending generally in the machine direction. The contours of the perforation patterns 132a and 132b can take virtually any form and/or location.

As used throughout the specification and claims, the word "penetrate" and any variants thereof means either 1) to disrupt the fiber structure of a web to weaken it by compressing or moving the fibers apart, or 2) to deflect or displace a web in the "Z" direction, i.e., perpendicular to the plane or surface of a web, or 3) to deflect or displace a web sufficiently to provide a visually perceptible perforation, or 4) to extend completely through a web, to facilitate tearing or separating successive sheets of a fibrous structure by a consumer at defined locations, e.g., in perforations formed along rolls of paper towels, bath tissue and the like.

As used throughout the specification and claims, the phrase "degree of penetration" and any variants thereof means either 1) the extent to which the fibers in a web are compressed or moved apart, or 2) the extent to which the web is deflected or displaced in the "Z" direction, i.e., the direction perpendicular to the plane or surface of a web, or 3) the size of openings which are formed in a web, which determines the strength or weakness of the web between successive defined sheets after a selected perforation design has been formed in the web.

As used throughout the specification and claims, the word "overstrain" and any variants thereof means either 1) to disrupt the fiber structure of a web to weaken it by compressing or moving the fibers apart, or 2) to deflect or displace a web in the "Z" direction, i.e., perpendicular to the plane or surface of a web, or 3) to deflect or displace a web sufficiently to provide a visually perceptible perforation, or 4) to extend completely through a web, to facilitate tearing by a consumer at defined locations, e.g., along rolls of paper towels, bath tissue and the like.

As used throughout the specification and claims, the phrase "degree of overstraining" and any variants thereof means either 1) the extent to which the fibers in a web are compressed or moved apart, or 2) the extent to which the web is deflected or displaced in the "Z" direction, i.e., the direction perpendicular to the plane or surface of a web, or 3) the size of openings which are formed in a web, which determines the strength or weakness of the web after a selected perforation design has been formed in the web.

Additionally, and as used throughout the specification and claims, the phrase "degree of weakening" and any variants thereof, means the extent to which the strength of a web has been weakened as a result of penetration or overstraining of the web which can be controlled by selecting the characteristics such as the size, shape, footprints, etc. of the circumferential protrusions or perforating elements. It also means the extent to which the strength of the web has been weakened as a result of printing a liquid on the web. Further, it will be appreciated that various characteristics may be individually selected to thereby provide the circumferential protrusions, perforating elements and/or liquids with the same or different parametric values to thereby control the degree of weakening of the web at each individual location where it is desired that the web be perforated, e.g., in the cross direction and/or in the machine direction.

In addition to the foregoing, the various embodiments of mechanical perforators and liquid perforators result in improved reliability and lower manufacturing costs while at the same time making it possible to form virtually any desired perforation pattern or design, and it will be understood that the various features and technologies present in any one of the mechanical and liquid perforator embodiments can be appropriately implemented and combined with the features and technologies of any of the other mechanical and liquid perforator embodiments.

In all of the foregoing embodiments and configurations, it will be understood that since the webs may be transported along a path relative to the disclosed apparatus components by a device which may comprise a conventional web rewinder of a type well known in the art, the details of the rewinder and the manner in which it transports the web have not been set forth. Furthermore, the details of the web rewinder are not needed to understand the unique features of the embodiments and configurations disclosed herein and the manner in which they function. Similarly, it will be understood that the details need not be set forth for the controllers, motors, and associated gearing suitable for controlling and driving the various perforating rolls and printing rolls nor for the controllers for controlling the printing of non-contact printing devices such as inkjet printers and laser printers because they are all of types well known in the art.

With regard to non-limiting embodiments utilizing multiple rolls, cylinders or blades, it will be understood that they can utilize linear actuators and/or similar components for purposes of engaging and disengaging the various rolls, cylinders and/or similar components in a manner well known to those skilled in the art.

"Fibrous structure" as used herein means a structure that comprises one or more fibrous elements. In one example, a fibrous structure according to the present invention means an association of fibrous elements that together form a structure capable of performing a function.

The fibrous structures of the present invention may be homogeneous or may be layered. If layered, the fibrous structures may comprise at least 2 and/or at least 3 and/or at least 4 and/or at least 5 and/or at least 6 and/or at least 7 and/or at least 8 and/or at least 9 and/or at least 10 to about 25 and/or to about 20 and/or to about 18 and/or to about 16 layers.

In one example, the fibrous structures of the present invention are disposable. For example, the fibrous structures of the present invention are non-textile fibrous structures. In another example, the fibrous structures of the present invention are flushable such as bath paper.

Non-limiting examples of processes for making fibrous structures include known wet-laid papermaking processes, air-laid papermaking processes and wet, solution and dry filament spinning processes that are typically referred to as nonwoven processes. Further processing of the fibrous structure may be carried out such that a finished fibrous structure is formed. For example, in typical papermaking processes, the finished fibrous structure is the fibrous structure that is wound on the reel at the end of papermaking. The finished fibrous structure may subsequently be converted into a finished product, e.g. a sanitary tissue product.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present invention, a fiber may be a naturally occurring fiber, which means it is obtained from a naturally occurring source, such as a vegetative source, for example a tree and/or plant. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell and bagasse fibers can be used in the fibrous structures of the present invention. The fibrous structure or material of the web products which are the subject of this invention may be a single-ply or a multi-ply fibrous structure suitable for being converted into a through air dried perforated product.

With regard to the web products which are the subject of this invention, they may be referred to as "sanitary tissue products" which, as used herein, means a soft, low density (i.e. <about 0.15 g/cm$^3$) web useful as a wiping implement for post-urinary and post-bowel movement cleaning (bath tissue), for otorhinolaryngological discharges (facial tissue), and multi-functional absorbent and cleaning uses (absorbent towels). The sanitary tissue products may be convolutely wound or rolled upon itself about a core or without a core to form a sanitary tissue product roll. Such product rolls may comprise a plurality of connected, but perforated sheets of fibrous structure, that are separably dispensable from adjacent sheets.

In one example, the sanitary tissue products of the present invention comprise fibrous structures according to the present invention.

"Basis Weight" as used herein is the weight per unit area of a sample reported in lbs/3000 ft$^2$ or g/m$^2$. The sanitary tissue products of the present invention may have a Basis Weight of greater than 15 g/m$^2$ (9.2 lbs/3000 ft$^2$) to about 120 g/m$^2$ (73.8 lbs/3000 ft$^2$) and/or from about 15 g/m$^2$ (9.2 lbs/3000 ft$^2$) to about 110 g/m$^2$ (67.7 lbs/3000 ft$^2$) and/or from about 20 g/m$^2$ (12.3 lbs/3000 ft$^2$) to about 100 g/m$^2$ (61.5 lbs/3000 ft$^2$) and/or from about 30 (18.5 lbs/3000 ft$^2$) to 90 g/m$^2$ (55.4 lbs/3000 ft$^2$). In addition, the sanitary tissue products of the present invention may exhibit a basis weight between about 40 g/m$^2$ (24.6 lbs/3000 ft$^2$) to about 120 g/m$^2$ (73.8 lbs/3000 ft$^2$) and/or from about 50 g/m$^2$ (30.8 lbs/3000 ft$^2$) to about 110 g/m$^2$ (67.7 lbs/3000 ft$^2$) and/or from about 55 g/m$^2$ (33.8 lbs/3000 ft$^2$) to about 105 g/m$^2$ (64.6 lbs/3000 ft$^2$) and/or from about 60 (36.9 lbs/3000 ft$^2$) to 100 g/m$^2$ (61.5 lbs/3000 ft$^2$).

Sanitary tissue products of the present invention may exhibit a Total Dry Tensile value of less than about 3000 g/76.2 mm and/or less than 2000 g/76.2 mm and/or less than 1875 g/76.2 mm and/or less than 1850 g/76.2 mm and/or less than 1800 g/76.2 mm and/or less than 1700 g/76.2 mm and/or less than 1600 g/76.2 mm and/or less than 1560 g/76.2 mm and/or less than 1500 g/76.2 mm to about 450 g/76.2 mm and/or to about 600 g/76.2 mm and/or to about 800 g/76.2 mm and/or to about 1000 g/76.2 mm. In yet another example, the sanitary tissue products, for example single-ply, embossed sanitary tissue products, exhibit a Total Dry Tensile of less than about 1560 g/76.2 mm and/or less than 1500 g/76.2 mm and/or less than 1400 g/76.2 mm and/or less than 1300 g/76.2 mm and/or to about 450 g/76.2 mm and/or to about 600 g/76.2 mm and/or to about 800 g/76.2 mm and/or to about 1000 g/76.2 mm.

The sanitary tissue products of the present invention may exhibit an initial Total Wet Tensile Strength value of less than 600 g/76.2 mm and/or less than 450 g/76.2 mm and/or less than 300 g/76.2 mm and/or less than about 225 g/76.2 mm.

In accordance with the present invention, the web is formed of paper or a like material having one or more plies wherein the material is strong enough to form the wound or rolled product having repeating lines of perforation but weak enough to separate a selected sheet from the remainder of the wound or rolled product. The Perforation Tensile Strength value for sanitary tissue products such as paper towel products, bath tissue products, and the like can be determined by the Perforation Tensile Strength Method described infra.

A single ply paper towel product of the present invention may have a Perforation Tensile Strength value of less than about 150 g/in (1.97 g/76.2 mm), preferably less than about 120 g/in (1.57 g/76.2 mm), even more preferably less than about 100 g/in (1.31 g/76.2 mm), and yet more preferably less than about 50 g/in (0.66 g/76.2 mm). A two ply paper towel product of the present invention may have a Perforation Tensile Strength value of less than about 170 g/in (2.23 g/76.2 mm), more preferably less than about 160 g/in (2.10 g/76.2 mm), even more preferably less than about 150 g/in (1.97 g/76.2 mm), yet more preferably less than about 100 g/in (1.31 g/76.2 mm), even yet more preferably less than about 60 g/in (0.79 g/76.2 mm), and most preferably less than about 50 g/in (0.66 g/76.2 mm). A two-ply bath tissue product of the present invention may have a Perforation Tensile Strength value of less than about 160 g/in (2.10 g/76.2 mm), preferably less than about 150 g/in (1.97 g/76.2 mm), even more preferably less than about 120 g/in (1.57 g/76.2 mm), yet more preferably less than about 100 g/in (1.31 g/76.2 mm), and most preferably less than about 65 g/in (0.85 g/76.2 mm).

The sanitary tissue products of the present invention may exhibit a Density (measured at 95 g/in$^2$) of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$.

"Density" as used herein is calculated as the quotient of the Basis Weight expressed in grams per square meter divided by the Caliper expressed in microns. The resulting Density is expressed as grams per cubic centimeters (g/cm$^3$ or g/cc). Sanitary tissue products of the present invention may have Densities greater than 0.05 g/cm$^3$ and/or greater than 0.06 g/cm$^3$ and/or greater than 0.07 g/cm$^3$ and/or less than 0.10 g/cm$^3$ and/or less than 0.09 g/cm$^3$ and/or less than 0.08 g/cm$^3$. In one example, a fibrous structure of the present invention exhibits a density of from about 0.055 g/cm$^3$ to about 0.095 g/cm$^3$.

"Embossed" as used herein with respect to a fibrous structure means a fibrous structure that has been subjected to a process which converts a smooth surfaced fibrous structure to a decorative surface by replicating a design on one or more emboss rolls, which form a nip through which the fibrous structure passes. Embossed does not include creping, microcreping, printing or other processes that may impart a texture and/or decorative pattern to a fibrous structure. In one example, the embossed fibrous structure comprises deep nested embossments that exhibit an average peak of the embossment to valley of the embossment difference of greater than 600 µm and/or greater than 700 µm and/or greater than 800 µm and/or greater than 900 µm as measured using MicroCAD.

Test Methods

Unless otherwise specified, all tests described herein including those described under the Definitions section and the following test methods are conducted on samples that have been conditioned in a conditioned room at a temperature of 73° F.±4° F. (about 23° C.±2.2° C.) and a relative humidity of 50%±10% for 2 hours prior to the test. If the sample is in roll form, remove the first 35 to about 50 inches of the sample by unwinding and tearing off via the closest perforation line, if one is present, and discard before testing the sample. All plastic and paper board packaging materials must be carefully removed from the paper samples prior to testing. Discard any damaged product. All tests are conducted in such conditioned room.

a. Perforation Tensile Strength Test Method

Principle:

A strip of sample of known width is cut so that a product perforation line passes across the strip perpendicularly in the narrow (width) dimension about equal distance from either end. The sample is placed in a tensile tester in the normal manner and then tensile strength is determined. The point of failure (break) will be the perforation line. The strength of the perforation is reported in grams.

Apparatus:

Conditioned Room: Temperature and humidity controlled within the following limits:

Temperature—73° F.±2° F. (23° C.±1° C.)

Relative Humidity—50% (±2%)

Sample Cutter: JDC Precision Sample Cutter, 1 inch (25.4 mm) wide double edge cutter, Model JDC-1-12 (Recommended), or Model 1 JDC-1-10; equipped with a safety shield, P&G drawing No. A-PP-421; Obtain the cutter from Thwing Albert Instrument Company, 10960 Dutton Road, Philadelphia, Pa. 19154 Cutting Die: (Only for use in cutting samples with the Alpha Cutter) 1.0 inch wide×8.0 inches (25.4×203.2 mm) long on a ¾ inch (19 mm) base; Acme Steel Rule, Die Corp., 5 Stevens St., Waterbury, Conn., 06714, or equivalent. The die must be modified with soft foam rubber insert material. Soft foam rubber insert material: Polyurethan, ¼ in. (6.3 mm) thick, P-17 Crofteon, Inc., 1801 West Fourth St., Marion, Ind. 46952, or equivalent.

Tensile Tester Refer to Analystical Method GCAS 58007265 "Testing and Calibration of Instruments—the Tensile Tester"

Tensile Tester Grips: Thwing-Albert TAPPI air grips 00733-95

Calibration Weights Refer to Analytical Method GCAS 58007265 "Testing and Calibration of Instruments—The Tensile Tester"

Paper Cutter.

Rule: Ruler to check gauge length, 6 inch (152.4 mm) metal, with 0.01 inch (0.25 mm) graduations. Cat. #C305R-6, L.S. Starrett Co., Athel, Mass. 01331, or equivalent.

Resealable Plastic Bags: Recommended size 26.8 cm×27.9 cm.

Sample Preparation:

For this method, a usable unit is described as one finished product unit regardless of the number of plies.

Condition the rolls or usable units of product, with wrapper or packaging materials removed, in a room conditioned at 50±2% relative humidity, 73° F.±2° F. (23° C.±1° C.) for a minimum of two hours. For new roll remove at least the outer 8-10 usable units of product and discard. Do not test samples with defects such as perforation skips, wrinkles, tears, incomplete perfs, holes, etc. Replace with other usable unites free of such defects. For roll wipes, condition in sealed package for a minimum of two hours.

Towels:

At all times handle the samples in such a manner that the perforations between the usable units are not damaged or weakened. Prepare the samples for testing using one of the two methods (i.e., a continuous five-usable unit-strip or four two-usable unit strips) described below. For usable units having a length (MD) greater than 8 inches (203.2 mm), either approach may be used in preparing the sample. For usable units having a length (MD) less than or equal to 8 inches (203.2 mm), use only the approach requiring strips of two towels to prepare the samples for testing.

A. Continuous Strip of 5 Towels

For the continuous strip of five towels, fold the second towel approximately in the center so that the perforation between towels one and two lies exactly on top of the perforation between towels two and three. Continue folding the remaining usable units until the four perforations contained in the strip of five towels are exactly coincident in a stack. Using the paper cutter, make cuts parallel to the usable units a minimum of 7 inches (177.8 mm) wide by towel width long with the perforation aligned, parallel to the long dimension of the stack and approximately in its center.

B. Strip of 2 Towels

Where four pairs of usable units have been taken for the samples, stack these usable unit pairs, one on the other, so that their perforations are exactly coincident. Proceed as described above to cut this stack of usable units so that the coincident perforations are in the approximate middle of a 7 inch (177.8 mm) minimum by roll width stack and parallel to the stack long dimension.

Bath Tissue/Roll Wipes:

At all times the sample should be handled in such a manner that perforations between usable units are not damaged or weakened. Remove four strips of two usable units each whether consecutively or from various positions in the sample.

Lay the four strips, one on top of the other, being very careful that the perforations between the usable unit pairs are exactly coincident. Note: For roll wipes place the remaining wipes in a resealable plastic bag and seal bag. Test roll wipes immediately.

Using either a JDC cutter or a cutting die and Alpha cutter, cut a one-inch (25.4 mm) wide sample strip four finished product units thick in the machine direction of the stack of four thicknesses of product obtained by one of the above techniques (FIG. 02). The result will be a strip of sample four finished product units thick, one-inch (25.4 mm) wide by a minimum of seven inches (177.8 mm) long, having a perforation line perpendicular to the 8 inch (203.2 mm) dimension of the strip and in its approximate center.

Reference Table 1 for Preparation and Tensile Tester Settings.

TABLE 1

Perforation Strength Preparation

| Sample Description | Number of product units per test | Number of replicates per sample | Load divider | Tensile grip type |
|---|---|---|---|---|
| Towel | 1 | 4 | 1 | Flat |
| Bath Tissue/Roll Wipes | 1 | 4 | 1 | Flat |

Operation:

Reject results from any strip where the sample is not completely broken, preparing a replacement strip for testing as described in Sample Preparation (see examples below).

Towel (Work-to-Tear and Perforation Stretch):

Clamp the sample in the grips of a properly calibrated tensile tester. Determine the tensile strength and perforation stretch of each of the four strips of each sample. Each strip should break completely at the perforation. In cases where an Intelect 500 Tensile Tester is employed, a sensitivity of 0 g should be used to achieve this.

Bath Tissue/Roll Wipes (Perforation Strength and/or Work-to-Tear and Perforation Stretch):

Clamp the sample in the grips of a properly calibrated tensile tester. Determine the tensile strength of each of the four strips of each sample and/or determine the tensile strength and perforation stretch of each of the four strips of each sample. Each strip should break at the perforation. In cases where an Intelect 500 Tensile Tester is employed, a sensitivity of 0 g should be used to achieve this.

Calculations:

Since some tensile testers incorporate computer capabilities that support calculations, it may not be necessary to apply all of the following calculations to the test results. For example, the Thwing-Albert Intelect II STD tensile tester can be operated through its averaging mode for reporting the average perforation tensile strength and average perforation stretch.

Perforation Tensile Strength (All Products):

The perforation tensile is determined by dividing the sum of the perforation tensile strengths of the product by the number of strips tested.

$$\text{Perforation Tensile} = \frac{\text{Sum of tensile results for strips tested (grams)}}{\text{Number of strips tested}}$$

Perforation Stretch:

The perforation stretch is determined by dividing the sum of the perforation stretch readings of the product by the number of strips tested.

$$\text{Perforation Stretch} = \frac{\text{Sum of stretch results for strips tested (\%)}}{\text{Number of strips tested}}$$

"Work"-to-Tear Factor:

$$\text{Work-to-tear Factor } (WTTF) = \frac{\text{Perforation Tensile} \times \text{Perforation stretch}}{100}$$

Perforation Tensile to MD Tensile Ratio (PERFMD) (Tissue Only):

$$PERFMD = \frac{\text{Perforation Tensile}}{\text{Average Tensile Strength } (MD)}$$

b. Tensile Strength Test Method

Remove five (5) strips of four (4) usable units (also referred to as sheets) of fibrous structures and stack one on top of the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Co. of Philadelphia, Pa.) to make 4 separate stacks. Make sure stacks 1 and 3 are still identified for machine direction testing and stacks 2 and 4 are identified for cross direction testing.

Cut two 1 inch (2.54 cm) wide strips in the machine direction from stacks 1 and 3. Cut two 1 inch (2.54 cm) wide strips in the cross direction from stacks 2 and 4. There are now four 1 inch (2.54 cm) wide strips for machine direction tensile testing and four 1 inch (2.54 cm) wide strips for cross direction tensile testing. For these finished product samples, all eight 1 inch (2.54 cm) wide strips are five usable units (sheets) thick.

For the actual measurement of the tensile strength, use a Thwing-Albert Intelect II Standard Tensile Tester (Thwing-Albert Instrument Co. of Philadelphia, Pa.). Insert the flat face clamps into the unit and calibrate the tester according to the instructions given in the operation manual of the Thwing-Albert Intelect II. Set the instrument crosshead speed to 4.00 in/min (10.16 cm/min) and the 1st and 2nd gauge lengths to 2.00 inches (5.08 cm). The break sensitivity is set to 20.0 grams and the sample width is set to 1.00 inch (2.54 cm) and the sample thickness is set to 0.3937 inch (1 cm). The energy units are set to TEA and the tangent modulus (Modulus) trap setting is set to 38.1 g.

Take one of the fibrous structure sample strips and place one end of it in one clamp of the tensile tester. Place the other end of the fibrous structure sample strip in the other clamp. Make sure the long dimension of the fibrous structure sample strip is running parallel to the sides of the tensile tester. Also make sure the fibrous structure sample strips are not overhanging to the either side of the two clamps. In addition, the pressure of each of the clamps must be in full contact with the fibrous structure sample strip.

After inserting the fibrous structure sample strip into the two clamps, the instrument tension can be monitored. If it shows a value of 5 grams or more, the fibrous structure sample strip is too taut. Conversely, if a period of 2-3 seconds passes after starting the test before any value is recorded, the fibrous structure sample strip is too slack.

Start the tensile tester as described in the tensile tester instrument manual. The test is complete after the crosshead automatically returns to its initial starting position. When the test is complete, read and record the following with units of measure:

Peak Load Tensile (Tensile Strength) (g/in)

Test each of the samples in the same manner, recording the above measured values from each test.

Calculations:

Total Dry Tensile(TDT)=Peak Load MD Tensile (g/in)+ Peak Load CD Tensile (g/in)

Tensile Ratio=Peak Load MD Tensile (g/in)/ Peak Load CD Tensile (g/in)

Table 2 below tabulates some measured tensile values of various commercially available fibrous structures.

TABLE 2

Total and Perforation Tensile Strength Values for Various Substrates

| Fibrous Structure | # of Plies | Embossed | TAD[1] | Total Dry Tensile Strength g/76.2 mm | Perforation Tensile Strength g/in |
|---|---|---|---|---|---|
| Charmin ® Basic | 1 | N | Y | 1486 | |
| Charmm ® Basic | 1 | N | Y | 1463 | |
| Charmin ® Ultra Soft | 2 | N | Y | 1457 | 171 |
| Charmin ® Ultra Strong | 2 | Y | Y | 2396 | 190 |
| Cottonelle ® | 1 | N | Y | 1606 | |
| Cottonelle ® | 1 | N | Y | 1389 | |
| Cottonelle ® Ultra | 2 | N | Y | 1823 | 174 |
| Cottonelle ® Ultra | 2 | N | Y | 2052 | |
| Scott ® 1000 | 1 | Y | N | 1568 | 271 |
| Scott ® Extra Soft | 1 | N | Y | 1901 | 176 |
| Scott ® Extra Soft | 1 | Y | Y | 1645 | 223 |
| Bounty ® Basic | 1 | N | Y | 3827 | |
| Bounty ® Basic | 1 | Y | Y | 3821 | |
| Viva ® | 1 | N | Y | 2542 | 153 |
| Quilted Northern ® Ultra Plush | 3 | Y | N | 1609 | 166 |
| Quilted Northern ® Ultra | 2 | Y | N | 1296 | |
| Quilted Northern ® | 2 | Y | N | 1264 | |
| Angel Soft ® | 2 | Y | N | 1465 | 166 |

[1]"TAD" as used herein means through air dried.

With regard to the foregoing parametric values, they are non-limiting examples of physical property values for some fibrous structures or materials that can be utilized for sanitary tissue products that can be formed as a wound or rolled web in accordance with the present invention. These non-limiting examples are materials which are strong enough to enable a wound or rolled web product to be formed having repeating lines of perforation defining a plurality of sheets. Further, these non-limiting examples are materials which are also weak enough to enable a consumer to separate a selected one of the sheets, typically the end sheet, from the remainder of the wound or rolled product by tearing along one of the lines of perforation defining the sheet.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. A web product comprising:
a web formed of paper material having one or more plies and having a first side and a second side, the web having a plurality of spaced apart and repeating lines of perforation, the repeating lines of perforation each comprising a plurality of individual liquid weakener perforations, the plurality of individual liquid weakener perforations extending substantially from the first to the second side generally in a cross direction of the web, each of the individual liquid weakener perforations being formed by printing a liquid weakener onto the web at a discrete location to be weakened, the web being formed of a material strong enough to form a wound or rolled product having a plurality of sheets defined by the repeating lines of perforation but weak enough to separate a selected one of the sheets from the remainder of the wound or rolled product by tearing along one of the repeating lines of perforation.

2. The product of claim 1 wherein the liquid weakener comprises a debonder for printing onto the web at the discrete location for each of the individual liquid weakener perforations.

3. The product of claim 2 wherein the debonder comprises a material which chemically reacts with the paper or the like material to form the individual liquid weakener perforations.

4. The product of claim 1 wherein the liquid weakener printed onto the web is a material having a delayed reaction time before forming the individual liquid weakener perforations.

5. The product of claim 1 wherein the liquid weakener printed onto the web is a tinted material to provide a visual indicator of the individual liquid weakener perforations.

6. The product of claim 1 wherein the liquid weakener comprises a first liquid and a second liquid printed onto the web at each of the discrete locations wherein the first and second liquids interact to form the individual liquid weakener perforations.

7. The product of claim 1 wherein the discrete locations where the liquid weakener perforations are formed are arranged to form a selected perforation design.

8. The product of claim 1 wherein the discrete locations where the liquid weakener perforations are formed are arranged to form a nonlinear perforation design.

9. A web product comprising:
a web formed of paper material having one or more plies and having a first side and a second side, the web having a plurality of spaced apart and repeating lines of perforations, the repeating lines of perforations each comprising a plurality of individual liquid weakener perforations, the plurality of individual liquid weakener perforations extending substantially from the first to the second side generally in a cross direction of the web, at least some of the individual liquid weakener perforations being formed by mechanically weakening the web at discrete locations where the web is to be mechanically weakened and a liquid weakener on the web in one or more locations at or near where the web has been mechanically weakened.

10. The product of claim 9 wherein the liquid weakener printed onto the web is a tinted material to provide a visual indicator of the individual liquid weakener perforations formed by printing the liquid weakener onto the web.

11. The product of claim 9 wherein some of the individual liquid weakener perforations are differently formed to produce a different perforation tensile strength in different areas of the web.

12. The product of claim 9 wherein the liquid weakener printed on the web causes the lines of perforation to have a first tensile strength during production and a second, weaker tensile strength after the web has been converted into a finished product.

13. The product of claim 9 wherein the mechanical weakener and the liquid printing device are positioned to form a selected perforation design.

14. A web product comprising:
a web formed of paper material having one or more plies and having a first side and a second side, the web having a plurality of spaced apart and repeating lines of perforations extending generally in the cross direction and at least one line of perforations extending generally in the machine direction, the repeating lines of perforations extending generally in the cross direction and the at least one line of perforations extending generally in the machine direction each comprising a plurality of liquid weakener perforations wherein each of the liquid weakener perforations is formed at a discrete location, the plurality of liquid weakener perforations generally in the cross direction extending substantially from the first side to the second side of the web and being formed at least in part by liquid weakening of the web by printing a liquid weakener onto the web, the web being formed of a material strong enough to form a wound or rolled product having a plurality of sheets defined by the repeating lines of perforation but weak enough to separate a selected one of the sheets from the remainder of the wound or rolled product by tearing along one of the repeating lines of perforation.

15. The product of claim 14 wherein the liquid weakener printed onto the web is a tinted material to provide a visual indicator of the individual liquid weakener perforations formed by printing the liquid weakener onto the web.

16. The product of claim 14 wherein the liquid weakener comprises a first liquid and a second liquid printed onto the web at each of the discrete locations whereby the first and second liquids interact to form the individual liquid weakener perforations.

17. The product of claim 14 wherein some of the individual liquid weakener perforations are differently formed to produce a different perforation tensile strength in different areas of the web.

18. The product of claim 14 wherein the liquid weakener perforations formed by the liquid weakener have a first perforation tensile strength during production and a second, weaker perforation tensile strength after the web has been converted into a finished product.

19. The product of claim 14 wherein the discrete locations where the lines of perforation in at least one of the cross direction and the machine direction are formed are arranged to form a selected perforation design.

20. The product of claim 14 wherein the discrete locations where the lines of perforation are formed in at least one of the cross direction and the machine direction are arranged to form a nonlinear perforation design.

* * * * *